UNITED STATES PATENT OFFICE.

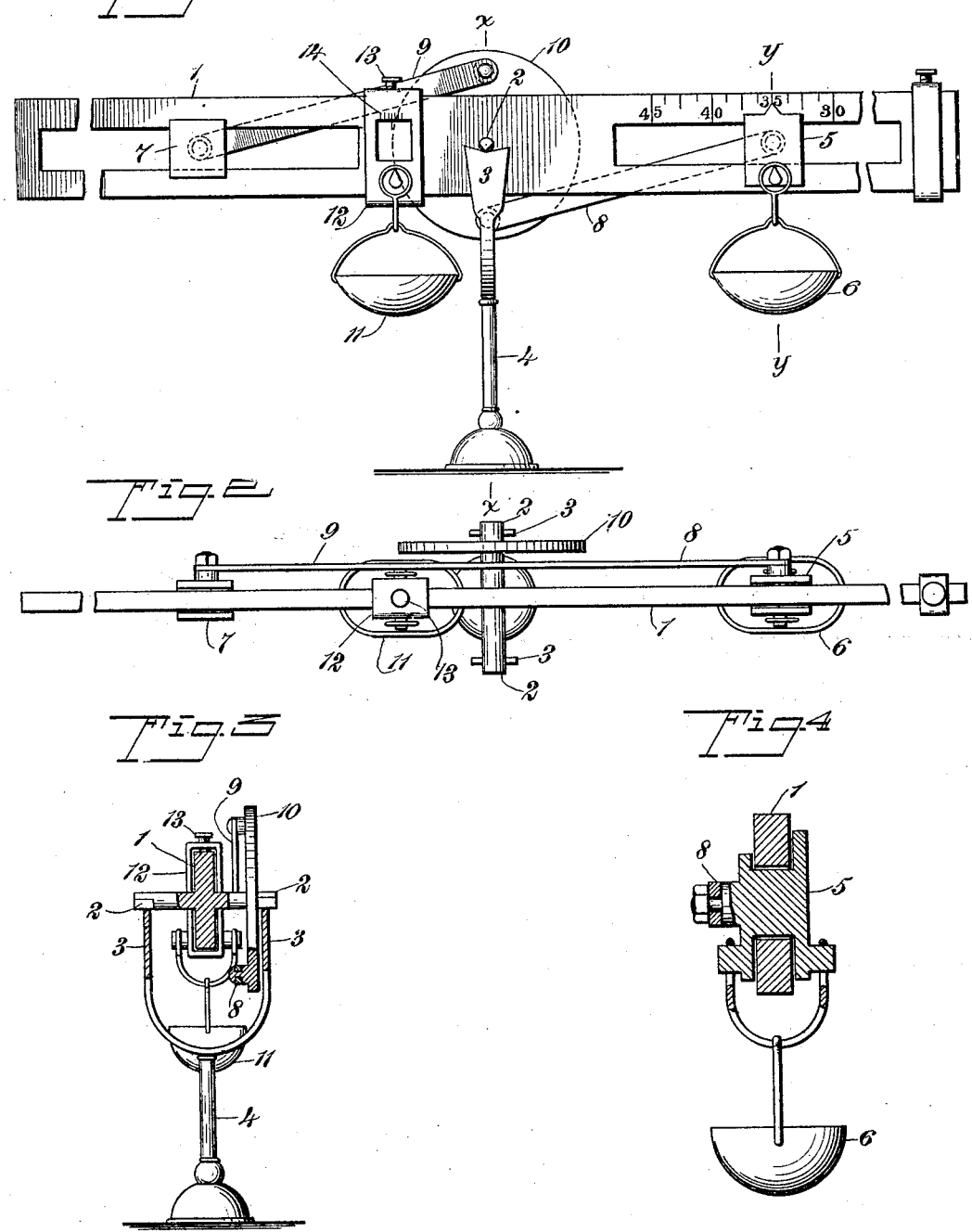

GEORGE RAYMOND BROWN, OF PLEDGER, TEXAS.

PROPORTIONATE SCALE.

SPECIFICATION forming part of Letters Patent No. 697,318, dated April 8, 1902.

Application filed May 29, 1901. Serial No. 62,342. (No model.)

*To all whom it may concern:*

Be it known that I, GEORGE RAYMOND BROWN, a citizen of the United States, and a resident of Pledger, in the county of Matagorda and State of Texas, have invented a new and Improved Proportionate Scale, of which the following is a full, clear, and exact description.

This invention relates particularly to improvements in scales for determining the relative proportion or percentage of lint contained in seed-cotton; and the object is to provide a scale of simple construction by means of which the proportions may be quickly and accurately determined.

I will describe a proportionate scale embodying my invention and then point out the novel features in the appended claim.

Reference is to be had to the accompanying drawings, forming a part of this specification, in which similar characters of reference indicate corresponding parts in all the figures.

Figure 1 is a front elevation of a proportionate scale embodying my invention. Fig. 2 is a plan view thereof. Fig. 3 is a section on the line $x\ x$ of Fig. 1, and Fig. 4 is a section on the line $y\ y$ of Fig. 1.

Referring to the drawings, 1 designates a scale-beam provided with fulcrum-points 2 on its opposite sides, which are supported on arms 3, extended from a standard 4. Mounted to slide on the beam is a poise-block 5, to which is attached a pan 6, and also mounted to slide on the scale-beam is a balancing-block 7. The two blocks 5 and 7 are connected by links 8 9 to a wheel or disk 10, mounted to rotate on one of the fulcrum-points of the scale-beam. The beam 1 is longitudinally slotted at opposite sides of its fulcrum, and the blocks 5 and 7 slide in these slots. The block 7 serves as a counterbalance for the block 5 and the pan 6 supported thereon.

Attached to the scale-beam at one side of its fulcrum is a fixed pan 11. As here shown, this fixed pan is attached to a loop 12, normally secured to the scale-beam 1 by means of a set-screw 13; but it is designed to slide on the scale-beam a short distance for the purpose of reaching a proper balance. This loop 12 is provided with a scale or graduation 14 to indicate its center either to the right or left, so as to compensate for any loss in the turnout of large quantities of seed after being ginned in gin-batteries.

In the operation, the fixed scoop 11 being in balance with the scale-beam at the right when the scale is empty, the counterpoise balancing the movable scoop at any point, the scale will be in balance at any position; but when any article—such, for instance, as lint or husks—is placed in the movable scoop it will exert its gravity only against an article such as seed in the fixed scoop 11, and when the movable scoop is moved along the beam until a balance is reached the percentage of material in the movable scoop will be pointed out on the graduation.

Further, as regards the adjustment of the part 12 making or providing for an accurate weighing by moving the fixed scoop to the left will cause or require a proportionate further movement of the movable scoop or pan to the right to compensate for the practically invisible loss of lint-cotton which is invariably taking place in transport from a wagon to the condenser and is caused by the loss of fine particles of lint blowing from the thin screens of the condenser and lint-flues. Such having been ascertained, a movement of the fixed scoop to the left will cause a lower indication on the scale-beam, thereby giving the actual turnout of lint-cotton obtained from the seed-cotton.

Having thus described my invention, I claim as new and desire to secure by Letters Patent—

A scale-beam, a disk mounted to rotate on one of the fulcrum-points of the beam, blocks mounted to slide on the beam at opposite sides of the fulcrum, links connecting the disk and blocks, a pan supported on one of the blocks, a loop slidable on the beam, a set-screw for holding the loop as adjusted, and a pan supported by said loop, substantially as specified.

In testimony whereof I have signed my name to this specification in the presence of two subscribing witnesses.

GEORGE RAYMOND BROWN.

Witnesses:
  TOM BROOKS,
  W. M. STAFFORD.